(12) United States Patent
Nalavade et al.

(10) Patent No.: US 12,164,526 B1
(45) Date of Patent: Dec. 10, 2024

(54) TRANSMISSION OF A COMMUNICATION WITH CONTENT ADAPTED TO A PROFILE STATE

(71) Applicant: Capital One Services, LLC, McLean, VA (US)

(72) Inventors: Satyajit Sajanrao Nalavade, Mckinney, TX (US); Joseph Bryan Hensarling, Roanoke, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/364,771

(22) Filed: Aug. 3, 2023

(51) Int. Cl.
*G06F 16/2455* (2019.01)
*G06F 16/23* (2019.01)

(52) U.S. Cl.
CPC .... *G06F 16/24568* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 5,933,811 A | 8/1999 | Angles et al. | |
| 8,639,563 B2 | 1/2014 | Angell et al. | |
| 10,409,780 B1* | 9/2019 | Ullrich | G06F 16/178 |
| 10,942,913 B1* | 3/2021 | Khoyilar | G06F 9/542 |
| 2012/0086544 A1* | 4/2012 | Kemp | G06F 16/22 340/5.1 |
| 2012/0102114 A1* | 4/2012 | Dunn | G06F 16/951 709/204 |
| 2014/0195476 A1* | 7/2014 | Sxhmidt | G06Q 30/0633 707/609 |
| 2020/0233850 A1* | 7/2020 | Girulat, Jr. | G06F 16/2379 |
| 2022/0327653 A1* | 10/2022 | Ramos | G06Q 90/00 |

* cited by examiner

*Primary Examiner* — Irene Baker
(74) *Attorney, Agent, or Firm* — Harrity & Harrity, LLP

(57) ABSTRACT

In some implementations, a device may identify an event relating to a potential transaction between a user and an entity. The device may determine, responsive to identifying the event, a profile associated with the user based on an aggregation of data relating to one or more events, including the event, associated with the user and the entity. The device may evaluate the profile to identify a type of content to include in a communication for the user. The device may cause transmission of the communication, including the type of content, for the user.

20 Claims, 7 Drawing Sheets

TRANSMISSION OF A COMMUNICATION WITH CONTENT ADAPTED TO A PROFILE STATE

BACKGROUND

A communication device may transmit communications by email, text message, automated phone calls, or the like. In some examples, the communication device may transmit hundreds, thousands, or even millions of communications over a relatively short period of time. Sometimes, a recipient of a communication may not open, read, answer, or respond to the communication.

SUMMARY

Some implementations described herein relate to a system for transmission of a communication with content adapted to a profile state. The system may include one or more memories and one or more processors communicatively coupled to the one or more memories. The one or more processors may be configured to retrieve, from an event stream, event data relating to an event associated with a user and an entity, where the event data identifies the user, the entity, and a type of the event. The one or more processors may be configured to cause, based on the event, a first record to be added in a first database, where the first record is based on the event data. The one or more processors may be configured to cause, responsive to addition of the first record in the first database, a second record to be added or updated in a second database, where the second record indicates a profile, associated with the user, that is based on an aggregation of data in one or more records, including the first record, relating to the user in the first database. The one or more processors may be configured to cause, responsive to addition or updating of the second record in the second database, a third record to be added in a third database, where the third record includes a snapshot of the profile associated with the user at a time after addition or updating of the second record. The one or more processors may be configured to evaluate, responsive to addition of the third record in the third database, the snapshot of the profile using one or more rules to identify a type of content to include in a communication for the user. The one or more processors may be configured to cause transmission of the communication, including the type of content, for the user.

Some implementations described herein relate to a method of transmission of a communication with content adapted to a profile state. The method may include identifying, by a device, an event relating to a potential transaction between a user and an entity. The method may include determining, by the device and responsive to identifying the event, a profile associated with the user based on an aggregation of data relating to one or more events, including the event, associated with the user and the entity. The method may include evaluating, by the device, the profile to identify a type of content to include in a communication for the user. The method may include causing, by the device, transmission of the communication, including the type of content, for the user.

Some implementations described herein relate to a non-transitory computer-readable medium that stores a set of instructions for transmission of a communication with content adapted to a profile state. The set of instructions, when executed by one or more processors of a device, may cause the device to obtain a profile associated with a user that is based on an aggregation of data relating to multiple events that relate to a potential transaction between the user and an entity. The set of instructions, when executed by one or more processors of the device, may cause the device to evaluate the profile using one or more rules to identify a type of content to include in a communication for the user. The set of instructions, when executed by one or more processors of the device, may cause the device to cause transmission of the communication including, the type of content, for the user.

DETAILED DESCRIPTION

Figure 1A:
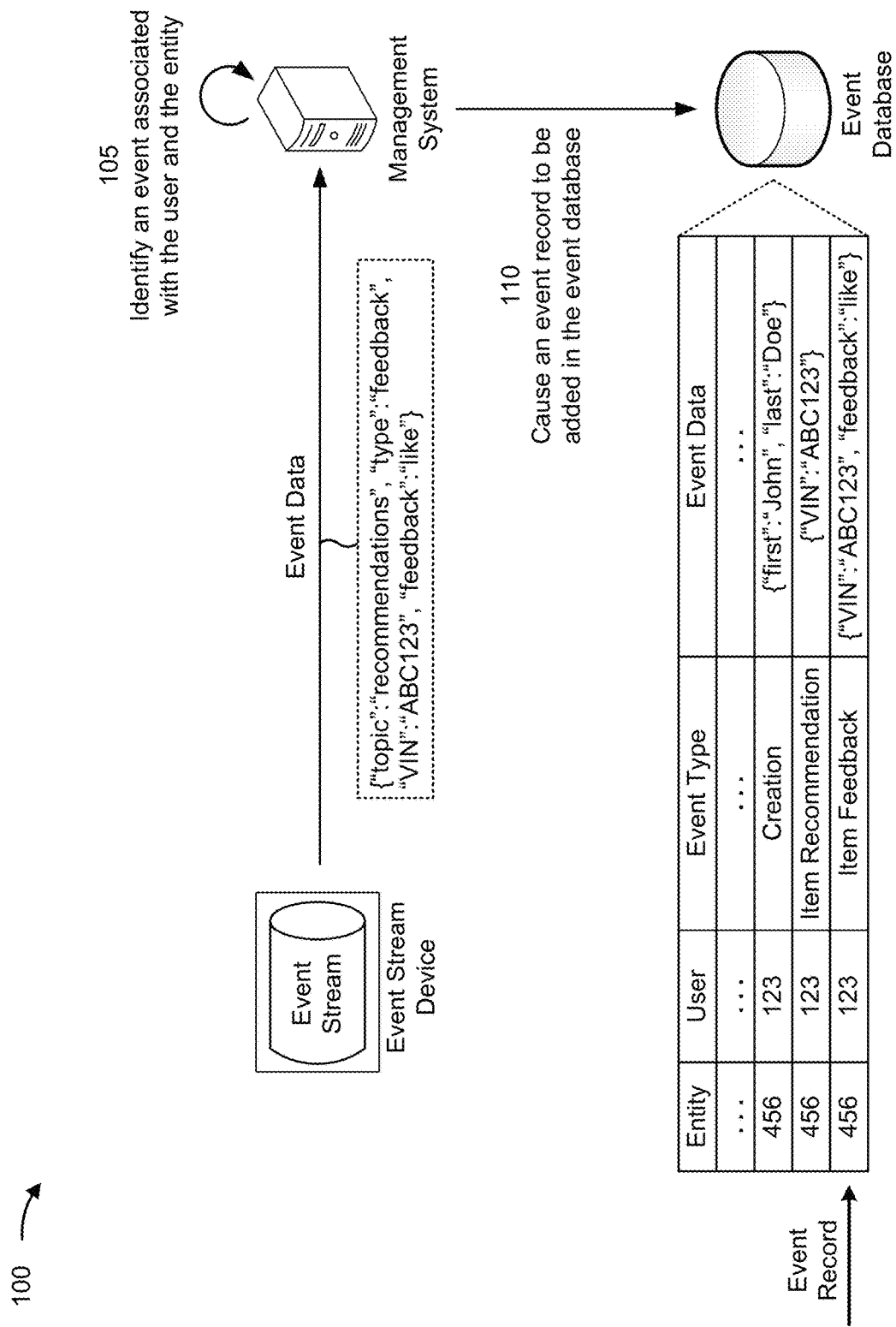
FIGS. 1A-1D are diagrams of an example associated with transmission of a communication with content adapted to a profile state, in accordance with some embodiments of the present disclosure.

The following detailed description of example implementations refers to the accompanying drawings. The same reference numbers in different drawings may identify the same or similar elements.

Communications may be transmitted by email, text message, automated phone calls, or the like. In general, the transmission of a single communication may use minimal computing resources (e.g., memory resources, processor resources, or the like) of the transmitter and minimal resources of a communications network on which the communication is transmitted. However, commonly, an entity may be engaged in operations that call for the transmission of hundreds, thousands, or even millions of communications, which in the aggregate place a significant burden on computing resources and network resources. A timing for transmission of a communication may play a role in whether a recipient engages with the communication (e.g., opens the communication, reads the communication, responds to the communication, or the like). Thus, by transmitting communications without regard to timing, significant computing resources and network resources may be expended in an inefficient manner. A communication including content that is relevant to a recipient also may play a role in whether a recipient engages with the communication. Thus, by transmitting communications with content that lacks relevancy, significant computing resources and network resources may be expended in an inefficient manner.

Some implementations described herein enable the transmission of a communication for a user using a timing that is based on an occurrence of an event associated with the user and/or that includes content that is adapted to a current state of an event-based profile associated with the user. In some implementations, a system may monitor events (e.g., an account creation or update event, a loan qualification event, an item recommendation event, or the like) relating to a potential transaction (e.g., relating to a purchase of a vehicle) between the user and an entity. The system may determine (e.g., generate or update) the profile for the user based on the events. For example, the profile may be based on an aggregation of data relating to the events. The system may evaluate the profile, using one or more rules (e.g., using rules chaining), to identify a type of content (e.g., an item recommendation, a request to perform an action, a survey, or the like) to include in a communication for the user.

In some implementations, the system may use multiple databases to track events and determine the profile. As an example, based on identifying an event, the system may add a record based on the event in a first database. The first database may be configured such that adding the record in the first database causes the execution of code that automatically adds or updates a record, in a second database, identifying the profile of the user, which may be based on an aggregation of events, including the most-recent event, associated with the potential transaction between the user and an entity. Furthermore, the second database may be configured such that adding the record in the second database causes execution of code that automatically adds a record, in a third database, that includes a snapshot of a current state of the profile associated with the user. Accordingly, the system may evaluate the snapshot of the profile to identify the type of content to include in the communication for the user.

Thus, based on identifying a new event associated with the user, the system may cause transmission, to a user device associated with the user, of the communication that includes the type of content that has been identified based on the profile (e.g., which has a current state based on the new event). Thus, a timing of the communication coincides with the occurrence of the new event, and the content of the communication is more relevant to the user, thereby improving a probability that the user will engage with the communication. In this way, computing resources and network resources used for transmitting communications are utilized more efficiently.

FIGS. 1A-1D are diagrams of an example 100 associated with transmission of a communication with content adapted to a profile state. As shown in FIGS. 1A-1D, example 100 includes a management system, an event stream device, a data system (e.g., including one or more databases), and a user device. These devices are described in more detail in connection with FIGS. 2 and 3.

The management system may be associated with an entity, such as a financial institution. The management system may facilitate communications to a user (e.g., one or more users) in connection with an entity. For example, the user and the entity may have performed actions relating to a potential transaction (e.g., for purchasing a vehicle) between the user and the entity. Thus, the communications may be targeted to enticing the user to conduct the transaction with the entity. In some implementations, the management system, and/or one or more other devices, may monitor events relating to the potential transaction (e.g., in connection with the user, the entity, and/or a third party), and the management system, and/or the other device(s), may publish the events to an event stream implemented by the event stream device.

As shown in FIG. 1A, and by reference number 105, the management system may identify an event associated with the user and the entity. For example, the management system may obtain event data relating to an event associated with the user and the entity. As an example, the event data may relate to a plurality of events associated with one or more users and one or more entities. The event associated with the user and the entity may relate to a potential transaction between the user and the entity (e.g., a transaction that may occur, but does not have to occur). For example, the event may relate to an advancement of the user and the entity toward the potential transaction. The potential transaction may relate to a vehicle (e.g., a purchase of a vehicle from the entity by the user). The event data may identify the user, the entity, and/or a type of the event, among other examples.

Types of the event may include a creation or update event (e.g., an entry including information relating to the user, such as a name, an email address, an address, or the like, has been created or updated in a customer relationship management (CRM) system), a loan qualification event (e.g., the user has been approved in connection with a loan prequalification, a loan preapproval, a loan approval, or the like, for the potential transaction), an item recommendation event (e.g., the user has been provided with a recommendation of a particular item, such as a vehicle), an item feedback event (e.g., the user has provided an indication as to whether the user likes or dislikes a particular item, such as a vehicle), an availability check event (e.g., the user has performed a check as to whether a particular item, such as a vehicle, is available), an interaction event (e.g., the user has interacted with a tool or a calculator, such as a monthly payment estimator), a communication engagement event (e.g., the user has opened, responded to, or answered an email, a text message, a phone call, or the like relating to the potential transaction), an item trial event (e.g., the user has requested a trial for a particular item, such as a test drive of a vehicle), a transaction structure event (e.g., the user has created a deal structure, such as by configuring a down payment, a monthly payment, an interest rate, or the like, for a particular item, such as a vehicle), and/or a transaction structure sharing event (e.g., the user has shared a deal structure with the entity), among other examples.

The management system may obtain the event data from the events device. The events device may provide an event stream service (e.g., a broker that receives event data, and distributes the event data to interested parties). As an example, the management system may retrieve the event data from an event stream implemented by the events device. The event stream may be organized into topics, and event data for a topic may be made available (e.g., by a pull retrieval or a push retrieval) to subscribers or consumers of the topic. For example, each topic may relate to a respective one of the types of events described above. Event data of the event stream may be aggregated from multiple different sources, including the entity, the entity associated with the management system, and/or other sources. Thus, the event stream provides a way for the data from the multiple different sources to be aggregated and consumed from a single source.

The management system may retrieve the event data using an event listener component of the management system. For example, the management system, using the event listener component, may listen for events from one or more topics of the event stream. To retrieve the event data, the management system may transmit, to the event stream device, a request (e.g., an application programming interface (API) request) for events that have been published to the event stream, and receive, from the event stream device and in response to the request, the event data relating to the event (e.g., a pull retrieval of the event data). In some implementations, to retrieve the event data, the management system may receive, from the event stream device (e.g., at regular intervals or in response to publication of new event data), the event data relating to the event without having previously transmitted a request for events (e.g., a push retrieval of the event data).

As shown by reference number 110, the management system may cause a first record to be added to the first database. The first record may be based on the event data. The first database may be referred to herein as the "event database" and the first record may be referred to herein as the "event record." The event database may store records relating to events associated with one or more users and one or more entities (e.g., each record may relate to a single event, thereby providing a history of the events).

The event record may identify the user, the entity, and/or the type of the event, among other examples. Additionally, the event record may identify a unique identifier for the event, data relating to the event (e.g., for an item recommendation event, the data may indicate an identifier of the item, a make of the item, a model of the item, a brand of the item, or the like), and/or a timestamp for a time when the event occurred, among other examples. In some implementations, the management system may use the event listener component to cause the event record to be added to the event database.

Figure 1B:
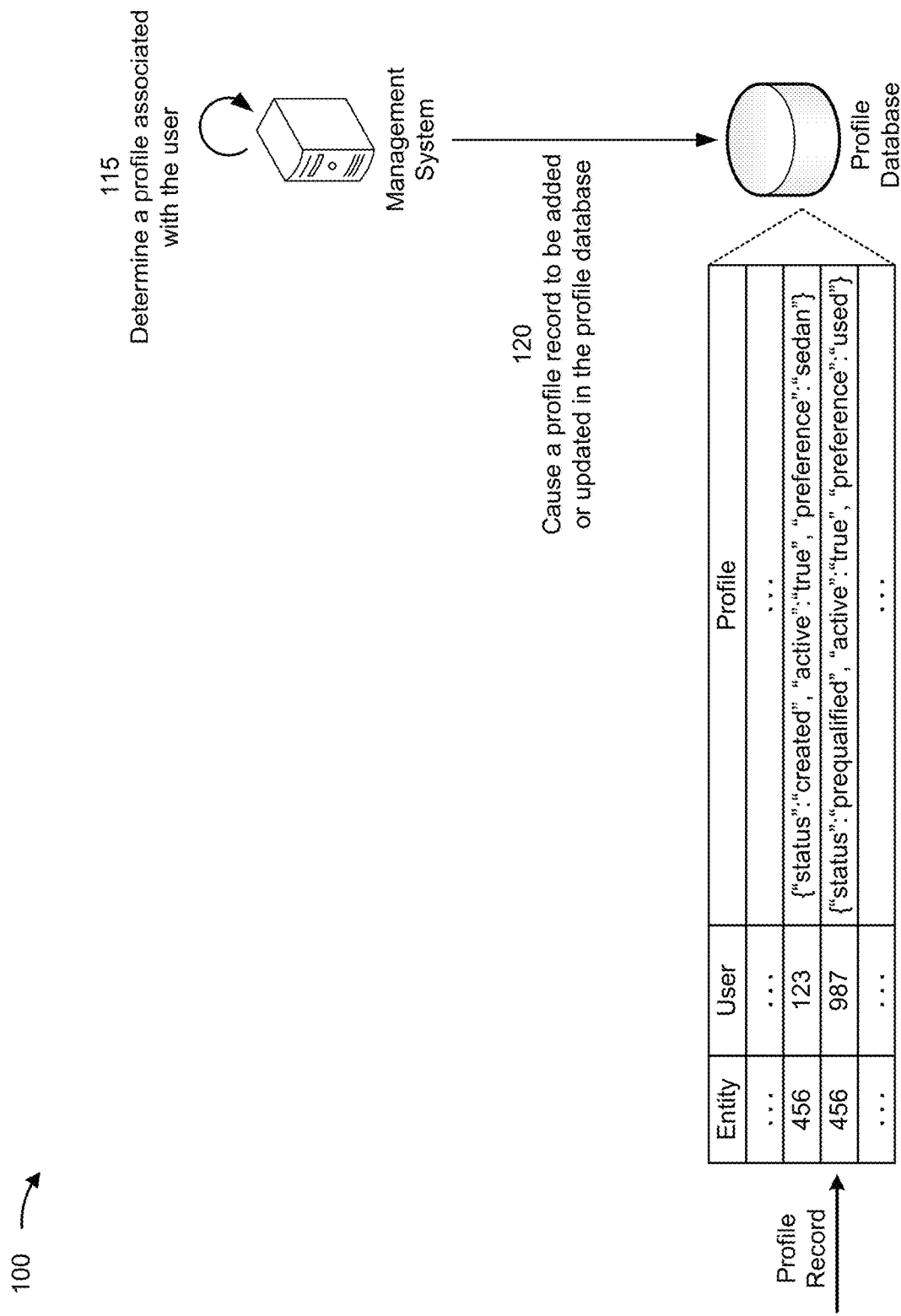

As shown in FIG. 1B, and by reference number 115, the management system may determine a profile associated with the user. For example, the management system may determine the profile responsive to identifying a new event associated with the user (e.g., the new event may trigger the management system to create or update the profile associated with the user). The management system may determine the profile based on an aggregation of data relating to one or more events associated with the user and the entity. For example, the data relating to the one or more events may include one or more event records associated with the user in the event database (e.g., the event record and at least one additional event record that was added to the event database before the event record). Thus, the profile may indicate a current state of the event(s) associated with the user. For example, the profile may indicate whether the user is prequalified for a loan, whether the user has recently engaged with a communication, and/or whether the user has had a trial of an item, among other examples.

In some implementations, the management system may determine one or more preferences of the user based on the data relating to the event(s), and the profile may indicate the one or more preferences. For example, the management system may perform the aggregation of the data to determine a preference of the user. In some implementations, the management system may determine the preference of the user by processing the data relating to the event(s) using natural language processing (NLP) and/or an artificial intelligence (AI) model. As an example, the data relating to the event(s) may indicate item feedback events when the user has provided indications that the user likes particular items, such as particular makes and models of vehicles. Continuing with the example, the management system may process (e.g., using NLP and/or an AI model) information associated with the items (e.g., the makes and models of the vehicles) to identify a characteristic associated with items (e.g., midsize sedans) that is a preference of the user.

As shown by reference number 120, the management system may cause a second record to be added or updated in a second database. The second record may indicate the profile, associated with the user, that is based on the aggregation of data in one or more event records relating to the user (e.g., the event record and at least one additional event record that was added to the event database before the event record). The second database may be referred to herein as the "profile database" and the second record may be referred to herein as the "profile record." The profile database may store records relating to profiles associated with one or more users (e.g., each record may relate to a single user).

The profile record may identify the user, the entity, and/or profile data (e.g., indicating a status of a most-recent event associated with the user, whether the user is active, and/or a preference of the user, among other examples), among other examples. Additionally, the profile record may indicate a loan qualification status associated with the user (e.g., a prequalified status or a not-prequalified status), an item recommendation history associated with the user (e.g., a list of items, such as vehicles, recommended to the user and/or feedback provided by the user for each of the items), an availability check history associated with the user (e.g., whether the user has performed checks as to an availability of one or more particular items, such as one or more vehicles), an item trial history associated with the user (e.g., whether the user has requested trials for one or more particular items, such as test drives of one or more vehicles), and/or a transaction structure history associated with the user (e.g., a list of transaction structures that the user has created for one or more particular items, such as one or more vehicle, and/or sharing statuses of the transaction structures), among other examples.

The management system may cause the profile record to be added (e.g., if no profile has been previously determined for the user) or updated (e.g., if a profile has been previously determined for the user) in the profile database responsive to the addition of the event record in the event database. In some implementations, the event record being added in the event database may trigger execution of code to cause (e.g., automatically) the profile record to be added or updated in the profile database. For example, the code may be a serverless function that is triggered by a change to the event database.

Figure 1C:
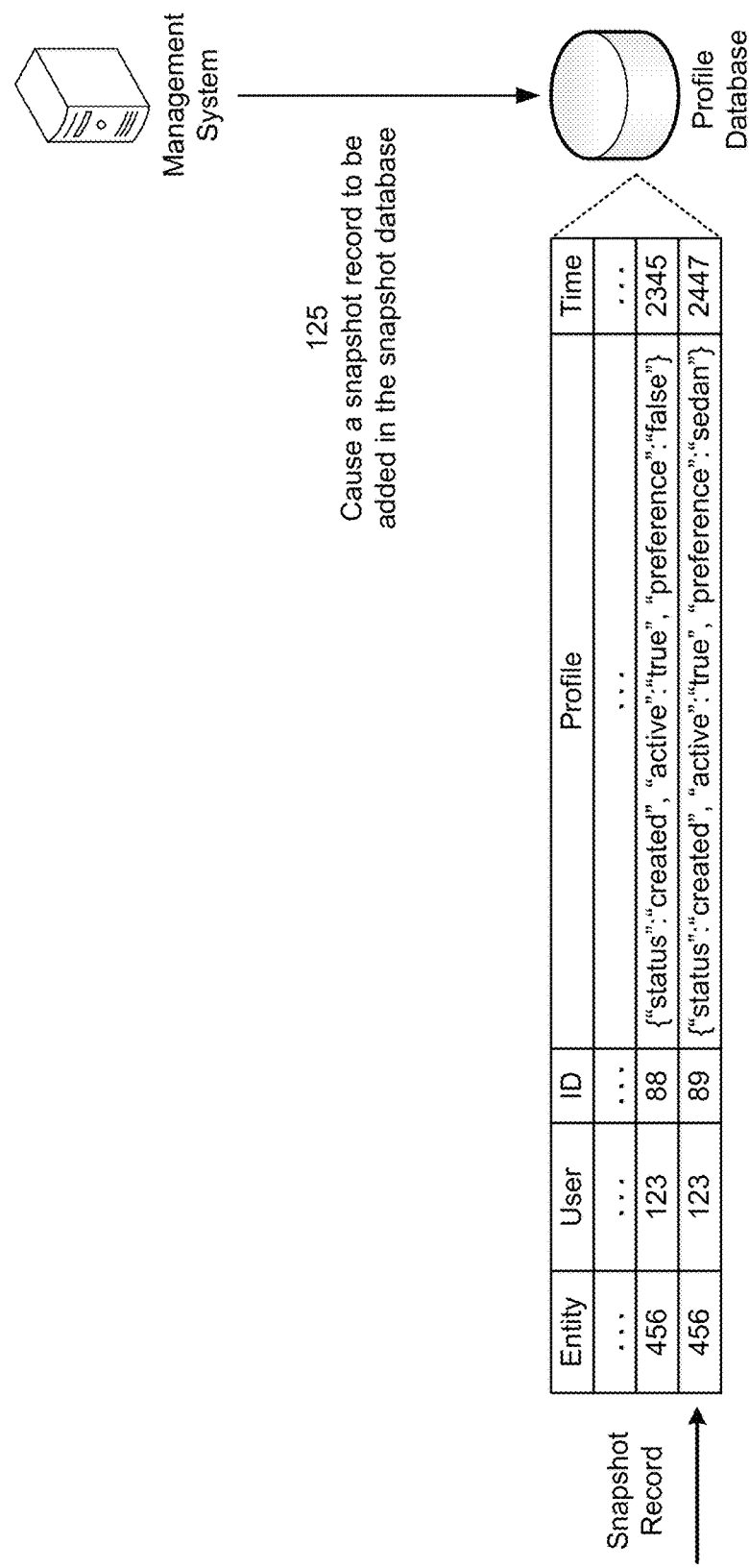

As shown in FIG. 1C, and by reference number 125, the management system may cause a third record to be added in a third database. The third record may include a snapshot (e.g., a capture) of the profile associated with the user at a time after the addition or updating of the profile record (e.g., the snapshot may preserve a state of the profile at the time the profile is created or updated). The third database may be referred to herein as the "snapshot database" and the third record may be referred to herein as the "snapshot record." The snapshot database may store records relating to snapshots of profiles associated with one or more users (e.g., each record may relate to a single profile snapshot, thereby providing a history of profile snapshots). The snapshot record may identify the user, the entity, the snapshot of the profile, a unique identifier for the snapshot, and/or a timestamp for a time when snapshot was captured, among other examples.

The management system may cause the snapshot record to be added in the snapshot database responsive to the addition or updating of the profile record in the profile database. In some implementations, the profile record being added or updated in the profile database may trigger execution of code to cause (e.g., automatically) the snapshot record to be added in the snapshot database. For example, the code may be a serverless function that is triggered by a change to the profile database.

In some implementations, the snapshot database may be configured (e.g., optimized) for records to be read from the snapshot database, whereas the profile database may be configured (e.g., optimized) for records to be written to the profile database. For example, indexes may be created on one or more columns of the snapshot database to facilitate fast retrieval of records. In this way, the snapshot database may be more suitable for facilitating downstream consumption of profile data, as described herein, than the profile database. The event database, the profile database, and the snapshot database may each include one or more database tables that are included in a single database system or distributed across multiple database systems.

Figure 1D:
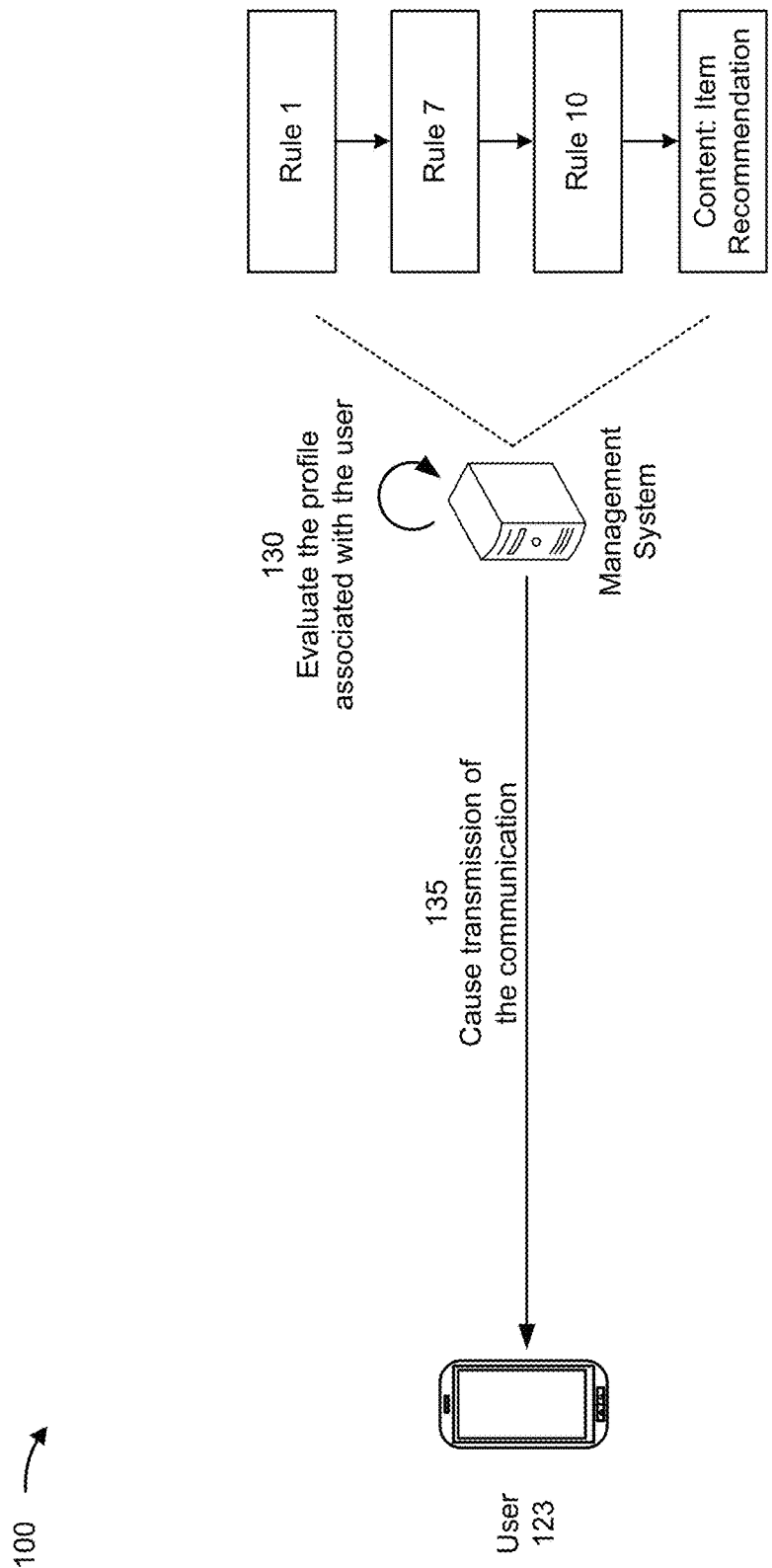

As shown in FIG. 1D, and by reference number 130, the management system may evaluate the profile associated with the user. For example, the management system may obtain the snapshot record, indicating the snapshot of the profile, from the snapshot database, and the management system may evaluate the snapshot of the profile. The management system (e.g., a rule engine system of the management system) may obtain and evaluate the snapshot record responsive to the addition of the snapshot record in the snapshot database. In some implementations, the snapshot record being added in the snapshot database may trigger execution of code to cause (e.g., automatically) the snapshot record to be obtained from the snapshot database for evaluation. For example, the code may be a serverless function that is triggered by a change to the snapshot database.

The management system may evaluate the profile to determine whether a communication is to be transmitted to the user, and based on a determination that a communication is to be transmitted to the user, to identify a type of content to include in the communication. For example, whether the communication is to be transmitted and/or the type of content to include in the communication may be based on a state of the profile. As an example, the type of content may be a first type based on a first state of the profile, or a second type based on a second state of the profile. The type of content may be an item recommendation, an item price quote, item availability information, a request to perform an action, a request to complete an action, a survey, scheduling information for a trial, and/or a progress update, among other examples.

In some implementations, to identify a type of content to include in the communication, the management system may identify a communication template (e.g., including form text, or the like) that is to be used for the communication. Additionally, or alternatively, the management system may generate content for the communication (e.g., based on a type of content to be used for the communication) using a generative language model. In some implementations, the management system may evaluate the profile to determine whether to schedule a meeting between the user and the entity, and the management system may schedule the meeting (e.g., by generating a calendar invite for a calendar application) based on a determination to scheduling the meeting.

The management system may evaluate the profile (e.g., the snapshot of the profile) using one or more rules. The rules may be predefined (e.g., in the rules engine system), but can be updated or modified from time to time. For example, the rules may be defined in a serverless function and/or in a serverless workflow.

In some implementations, the rules may be configured to not conflict with each other so that the management system will reach a single conclusion for a given profile (e.g., a conclusion not to transmit a communication or a conclusion to transmit a communication that includes a particular type of content). For example, a rule may be configured with a priority level, and the management system may execute rules in order of priority. Additionally, or alternatively, a rule may be configured with one or more execution conditions, and the management system may execute a rule only if the rule's execution conditions are satisfied. Additionally, or alternatively, a rule may be configured with one or more exclusion conditions, and the management system may not execute the rule if the rule's exclusion conditions are satisfied. Moreover, a rule may be limited in scope to have applicability to only a subset of all users associated with profiles.

In some implementations, the management system may use a decision tree configured with sequences of rules and associated conditions to facilitate the management system reaching a single conclusion. In some implementations, the management system may use rules chaining to facilitate the management system reaching a single conclusion. The rules chaining may utilize a backward chaining approach and/or a forward chaining approach. In some implementations, the rules may be structured as conditional expressions (e.g., if-then expressions).

A rule may relate to whether a user is active (e.g., has engaged in activity with respect to a potential transaction, such as using a tool or a calculator, or responding to an email, within a particular time window). A rule may relate to whether a user is inactive (e.g., has not engaged in activity with respect to a potential transaction within a particular time window). A rule may relate to whether a user is prequalified or preapproved for a loan for a potential transaction. A rule may relate to whether a user has been provided with an item recommendation, and/or relate to feedback provided by the user for one or more items. A rule may relate to whether a user has performed a check as to whether a particular item is available. A rule may relate to whether the user has requested a trial for a particular item and/or whether the user has received the trial. A rule may relate to whether a user has created a transaction structure for a particular item and/or whether the user shared the transaction structure with an entity. The rules used by the management system to evaluate the profile may include one or more of the aforementioned rules, and/or may include one or more rules based on a combination of multiple of the aforementioned rules.

The following examples indicate how the management system can use the rules to determine whether a communication is to be transmitted to the user and/or a type of content to include in the communication. In one example, if the user has been prequalified for a loan (e.g., based on a first rule relating to whether the user is prequalified for a loan), and if the user has provided positive feedback for an item recommendation (e.g., based on a second rule relating to whether the user has provided positive feedback for an item recommendation, if the first rule is satisfied), then the management system may determine to transmit a communication for the user that identifies price quotes for the item recommendation and/or items similar to the item recommendation (e.g., based on a third rule relating to using a price quote content type, if the first rule and the second rule are satisfied). In another example, if the user is inactive (e.g., based on a first rule relating to whether the user is inactive), then the management system may determine to transmit a communication for the user that identifies a survey to gauge the user's interest in the potential transaction (e.g., based on a second rule relating to using a survey content type, if the first rule is satisfied).

Additionally or alternatively to using rules, the management system may use a machine learning model to determine whether a communication is to be transmitted to the user and/or to identify a type of content to include in the communication. The machine learning model may be trained to output an indication of whether a communication is to be transmitted, to output an indication of a type of content to use, and/or to output the content that is to be used, based on an input of the user's profile. In some implementations, the management system may use the machine learning model to determine an update for one or more parameters of the rules (e.g., based on data relating to user engagement with transmitted communications).

As shown by reference number 135, the management system may cause transmission of the communication for the user (e.g., based on, and following, the occurrence of the event). For example, the management system may cause transmission of the communication based on evaluating the user's profile and determining that the communication is to be transmitted to the user. The communication may include the type of content that is identified by the management system based on evaluating the user's profile. The user may receive the communication via the user device associated with the user.

The communication may include an email message, a text message, an automated telephone call, and/or a message in a user interface (e.g., a web page, a mobile application user interface, or an extended reality user interface), among other examples. In some implementations, the management system may generate the communication and/or may transmit the communication. In some implementations, the management system may cause another device to generate the communication and/or to transmit the communication.

For example, based on determining that the communication is to be transmitted to the user and identifying the type of content to be used in the communication, the management system may add an indication for the communication to a queue (e.g., a queue database). Continuing with the example, responsive to the indication for the communication being added to the queue, the management system may invoke a message scheduler component (e.g., that is included in the management system or external to the management system) to schedule transmission of the communication for the user. For example, adding the indication of the communication to the queue (e.g., adding a record relating to the communication to the queue database) may trigger execution of code to invoke (e.g., automatically) the message scheduler component. For example, the code may be a serverless function that is triggered by a change to the queue database.

The message scheduler component may determine a timing and/or a channel (e.g., email, text messaging, or the like) for the communication based on preferences of the user and/or preferences of the entity. The message scheduler component may invoke (e.g., after a time delay) a content rendering component (e.g., that is included in the management system or external to the management system) to prepare a content of the communication (e.g., in accordance with the identified content type), and to transmit the communication.

In some implementations, the communication may include a link (e.g., the type of content that is identified may dictate a type of the link and/or one or more parameter for the link). The link may be configured to cause presentation of a user interface on the user device (e.g., when the user follows the link). For example, the user interface may include a web page, a user interface of a mobile application, a user interface of an extended reality application, or the like. The user interface may include content (e.g., in accordance with the link) relating to the type of content that is identified. For example, the content may include a recommendation of an item, such as a vehicle, for the user. Here, the content may include a virtual showroom, which may include a three-dimensional model of the item, that enables the user to virtually view the item. Additionally, or alternatively, the content may include a survey soliciting one or more preferences of the user (e.g., preferences relating to the item and/or the potential transaction), a calculator tool configured to calculate data (e.g., a monthly payment) associated with the potential transaction, and/or an application for services (e.g., for loan prequalification and/or loan preapproval) relating to the potential transaction.

In some implementations, the link may be configured to initiate a communication session between the user and the entity. For example, the link may cause initiation of a conference call between devices of the user and the entity, initiation of a video conference between devices of the user and the entity, initiate a chat session between devices of the user and the entity, or the like.

In this way, by basing the communication on an update to a current-state of the user's profile, the transmission of the communication may be better timed and the content of the communication may be more relevant to the user, thereby improving a probability that the user will engage with the communication. Accordingly, computing resources and network resources used for transmitting communications are utilized more efficiently.

As indicated above, FIGS. 1A-1D are provided as an example. Other examples may differ from what is described with regard to FIGS. 1A-1D.

Figure 2:
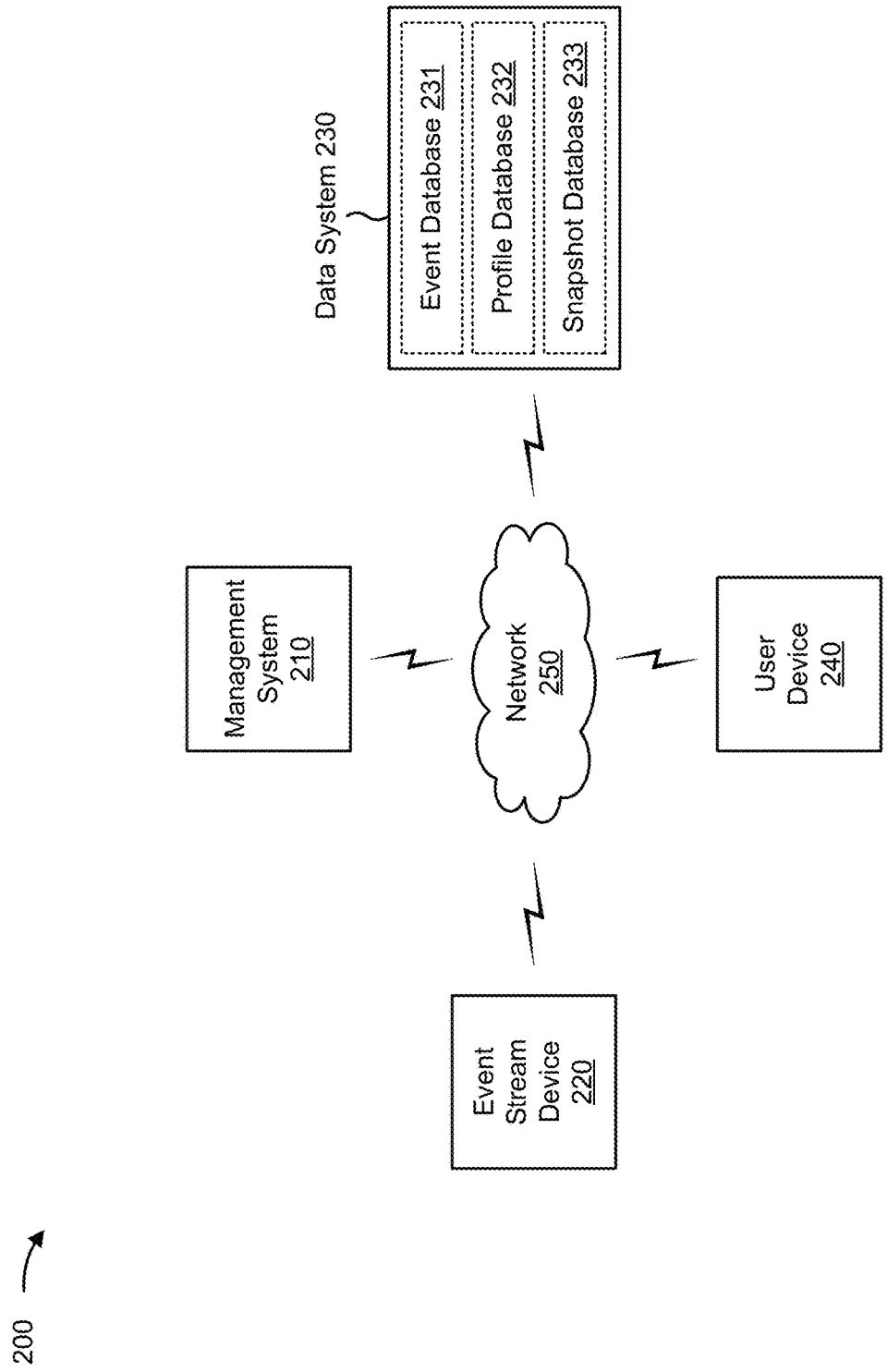
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a management system 210, an event stream device 220, a data system 230 (e.g., including an event database 231, a profile database 232, and/or a snapshot database 233), a user device 240, and a network 250. Devices of environment 200 may interconnect via wired connections, wireless connections, or a combination of wired and wireless connections.

The management system 210 may include one or more devices capable of receiving, generating, storing, processing, providing, and/or routing information associated with transmission of a communication with content adapted to a profile state, as described elsewhere herein. The management system 210 may include a communication device and/or a computing device. For example, the management system 210 may include a server, such as an application server, a client server, a web server, a database server, a host server, a proxy server, a virtual server (e.g., executing on computing hardware), or a server in a cloud computing system. In some implementations, the management system 210 may include computing hardware used in a cloud computing environment.

The event stream device 220 may include one or more devices capable of receiving, generating, storing, processing, providing, and/or routing information associated with event data associated with events, as described elsewhere herein. The event stream device 220 may include a communication device and/or a computing device. For example, the event stream device 220 may include a server, such as an application server, a client server, a web server, a database server, a host server, a proxy server, a virtual server (e.g., executing on computing hardware), or a server in a cloud computing system. In some implementations, the event stream device 220 may include computing hardware used in a cloud computing environment.

The data system 230 may include one or more devices capable of receiving, generating, storing, processing, and/or providing information associated with event tracking and/or profile generation, as described elsewhere herein. The data system 230 may include a communication device and/or a computing device. For example, the data system 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data system 230 may include the event database 231, the profile database 232, and/or the snapshot database 233. For example, these databases may store records that track a state of events associated with one or more users, as described elsewhere herein.

The user device 240 may include one or more devices capable of receiving, generating, storing, processing, and/or providing information associated with reception of communications, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
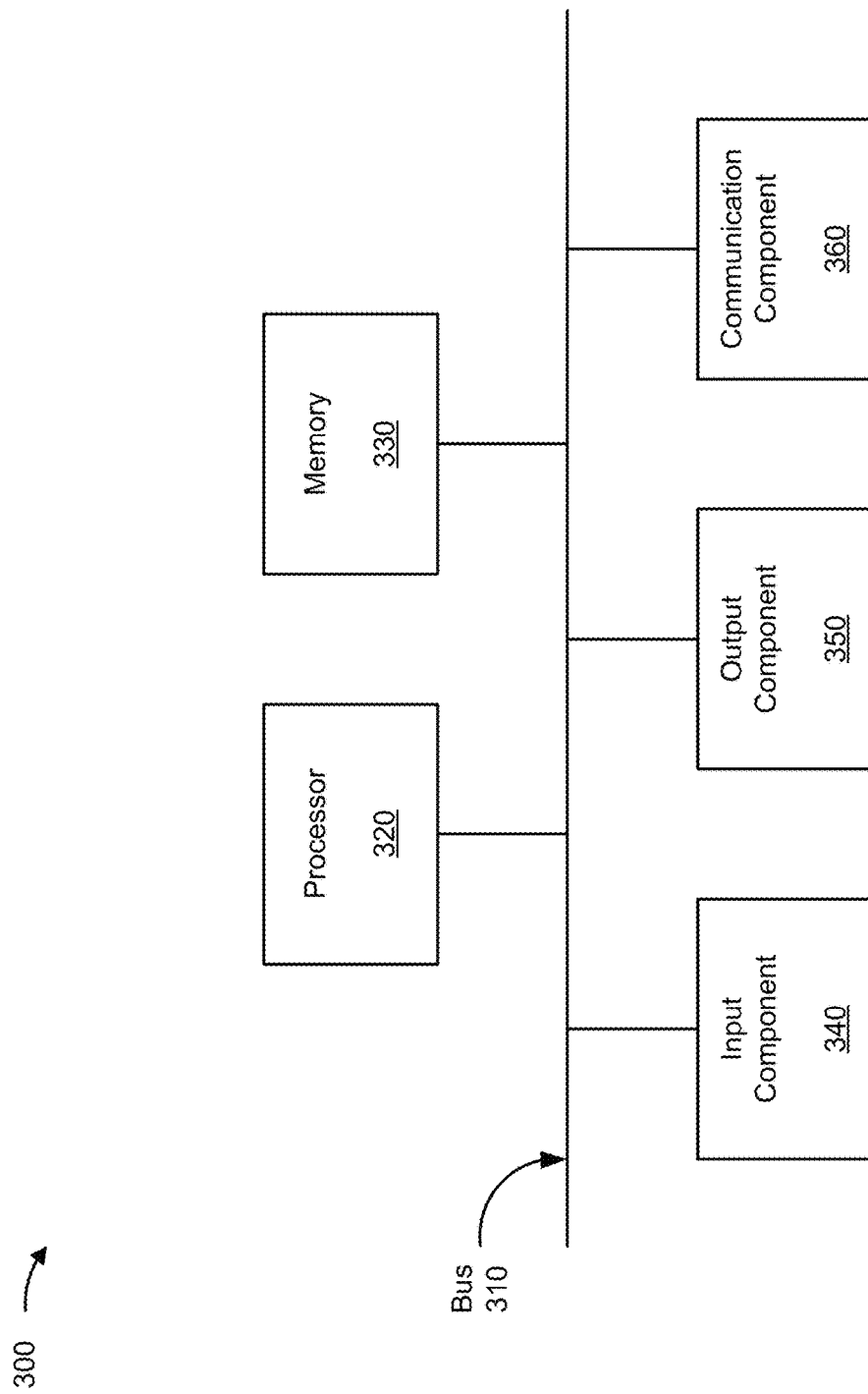
FIG. 3 is a diagram of example components of a device associated with transmission of a communication with content adapted to a profile state, in accordance with some embodiments of the present disclosure.

FIG. 3 is a diagram of example components of a device 300 associated with transmission of a communication with content adapted to a profile state. The device 300 may correspond to management system 210, event stream device 220, data system 230, and/or user device 240. In some implementations, management system 210, event stream device 220, data system 230, and/or user device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
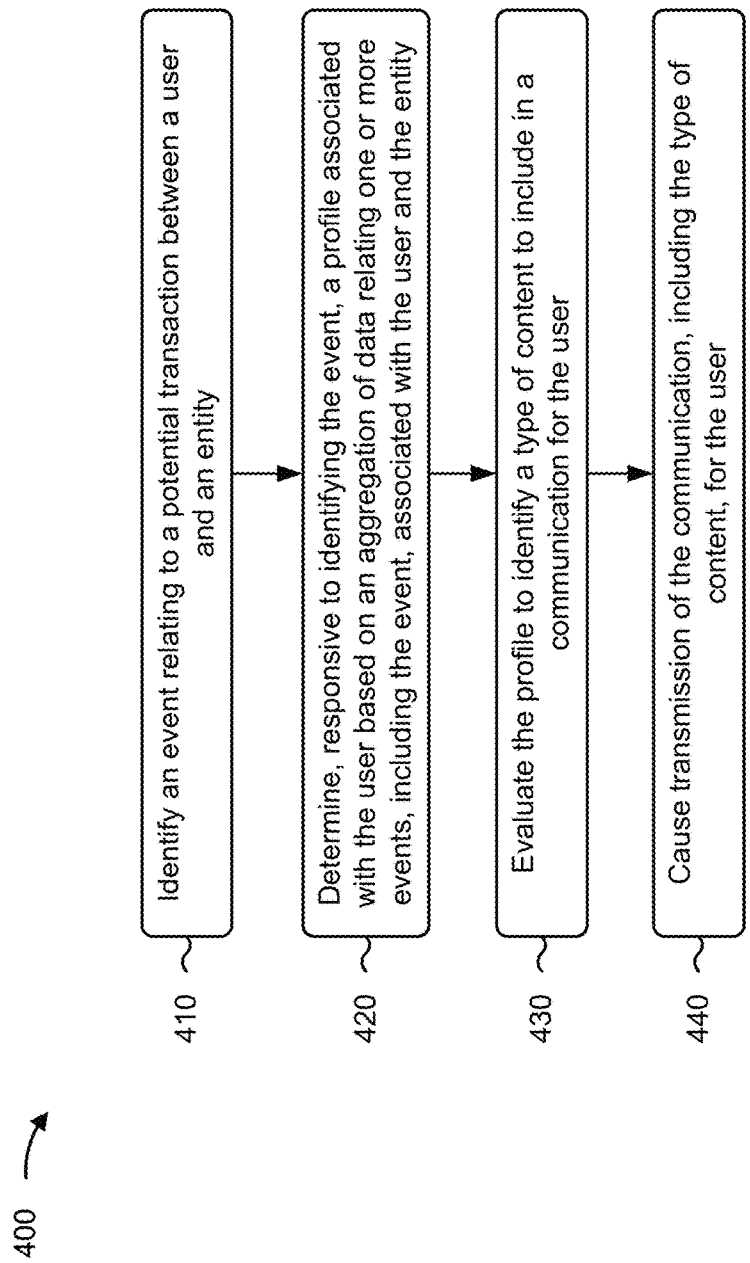
FIG. 4 is a flowchart of an example process associated with transmission of a communication with content adapted to a profile state, in accordance with some embodiments of the present disclosure.

FIG. 4 is a flowchart of an example process 400 associated with transmission of a communication with content adapted to a profile state. In some implementations, one or more process blocks of FIG. 4 may be performed by the management system 210. In some implementations, one or more process blocks of FIG. 4 may be performed by another device or a group of devices separate from or including the management system 210, such as the event stream device 220, the data system 230, and/or the user device 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include identifying an event relating to a potential transaction between a user and an entity (block 410). For example, the management system 210 (e.g., using processor 320, memory 330, and/or communication component 360) may identify an event relating to a potential transaction between a user and an entity, as described above in connection with reference number 105 of FIG. 1A. As an example, the event data, relating to the event, may be retrieved from an event stream.

As further shown in FIG. 4, process 400 may include determining, responsive to identifying the event, a profile associated with the user based on an aggregation of data relating one or more events, including the event, associated with the user and the entity (block 420). For example, the management system 210 (e.g., using processor 320 and/or memory 330) may determine, responsive to identifying the event, a profile associated with the user based on an aggregation of data relating one or more events, including the event, associated with the user and the entity, as described above in connection with reference number 115 of FIG. 1B. As an example, the profile may be determined responsive to identifying the new event associated with the user.

As further shown in FIG. 4, process 400 may include evaluating the profile to identify a type of content to include in a communication for the user (block 430). For example, the management system 210 (e.g., using processor 320 and/or memory 330) may evaluate the profile to identify a type of content to include in a communication for the user, as described above in connection with reference number 130 of FIG. 1D. As an example, the profiled may be evaluated using one or more rules.

As further shown in FIG. 4, process 400 may include causing transmission of the communication, including the type of content, for the user (block 440). For example, the management system 210 (e.g., using processor 320, memory 330, and/or communication component 360) may cause transmission of the communication, including the type of content, for the user, as described above in connection with reference number 135 of FIG. 1D. As an example, the communication may include an email message, a text message, an automated telephone call, and/or a message in a user interface, among other examples.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., a user item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for transmission of a communication with content adapted to a profile state, the system comprising:
   one or more memories; and
   one or more processors, communicatively coupled to the one or more memories, configured to:
      retrieve, from an event stream, event data relating to an event associated with a user and an entity,
         wherein the event data identifies the user, the entity, and a type of the event;
      cause, based on the event, a first record to be added in a first database,
         wherein the first record is based on the event data;
      cause, responsive to addition of the first record in the first database, a second record to be added or updated in a second database,
         wherein the second record indicates a profile, associated with the user, that is based on an aggregation of data in one or more records, including the first record, relating to the user in the first database;
      cause, responsive to addition or updating of the second record in the second database, a third record to be added in a third database,
         wherein the third record includes a snapshot of the profile associated with the user at a time after addition or updating of the second record;
      evaluate, responsive to addition of the third record in the third database, the snapshot of the profile using one or more rules to identify a type of content to include in a communication for the user; and
      cause transmission of the communication, including the type of content, for the user.

2. The system of claim 1, wherein the first record being added in the first database is to trigger execution of first code to cause the second record to be added or updated in the second database, and
   wherein the second record being added or updated in the second database is to trigger execution of second code to cause the third record to be added in the third database.

3. The system of claim 1, wherein the third record being added in the third database is to trigger execution of code to cause the third record to be obtained from the third database for evaluation.

4. The system of claim 1, wherein the event relates to a potential transaction between the user and the entity.

5. The system of claim 1, wherein the one or more processors, to evaluate the snapshot of the profile using the one or more rules, are configured to:
   evaluate the snapshot of the profile using the one or more rules to determine whether the communication is to be transmitted to the user, and based on a determination that the communication is to be transmitted to the user, to identify the type of content to include in the communication.

6. The system of claim 1, wherein the communication is an email message or a text message.

7. The system of claim 1, wherein the one or more records relating to the user include the first record and at least one additional record added to the first database before the first record.

8. The system of claim 1, wherein the one or more processors are further configured to:
   perform the aggregation of the data in the one or more records in the first database to determine a preference of the user,
      wherein the profile indicates the preference.

9. A method of transmission of a communication with content adapted to a profile state, comprising:
   identifying, by a device, an event relating to a potential transaction between a user and an entity;
   determining, by the device and responsive to identifying the event, a profile associated with the user based on an aggregation of data relating to one or more events, including the event, associated with the user and the entity;
   evaluating, by the device, the profile to identify a type of content to include in a communication for the user; and
   causing, by the device, transmission of the communication, including the type of content, for the user.

10. The method of claim 9, wherein the profile is evaluated using rules chaining.

11. The method of claim 9, further comprising:
    causing a first record, relating to the event, to be added in a first database;
    causing, responsive to addition of the first record in the first database, a second record to be added or updated in a second database,
       wherein the second record indicates the profile; and
    causing, responsive to addition or updating of the second record in the second database, a third record to be added in a third database,
       wherein the third record includes a snapshot of the profile at a time after addition or updating of the second record, and
       wherein the snapshot of the profile is evaluated to identify the type of content to include in the communication.

12. The method of claim 11, wherein the first record being added in the first database is to trigger execution of first code to cause the second record to be added or updated in the second database,
    wherein the second record being added or updated in the second database is to trigger execution of second code to cause the third record to be added in the third database, and wherein the third record being added in the third database is to trigger execution of third code to cause the third record to be obtained from the third database for evaluation.

13. The method of claim 9, wherein the communication includes a link configured to cause presentation of a user interface.

14. The method of claim 13, wherein the user interface includes content relating to one or more of:
- a recommendation of an item for the user,
- a survey soliciting one or more preferences of the user,
- a calculator tool configured to calculate data associated with a potential transaction between the user and the entity, or
- an application for services relating to the potential transaction.

15. A non-transitory computer-readable medium storing a set of instructions for transmission of a communication with content adapted to a profile state, the set of instructions comprising:
  one or more instructions that, when executed by one or more processors of a device, cause the device to:
    obtain a profile associated with a user that is based on an aggregation of data relating to multiple events that relate to a potential transaction between the user and an entity;
    evaluate the profile using one or more rules to identify a type of content to include in a communication for the user; and
    cause transmission of the communication including, the type of content, for the user.

16. The non-transitory computer-readable medium of claim 15, wherein the one or more instructions, when executed by the one or more processors, further cause the device to:
  cause a first record, relating to an event of the multiple events, to be added in a first database;
  cause, responsive to addition of the first record in the first database, a second record to be added or updated in a second database,
    wherein the second record indicates the profile; and
  cause, responsive to addition or updating of the second record in the second database, a third record to be added in a third database,
    wherein the third record includes a snapshot of the profile at a time after addition or updating of the second record.

17. The non-transitory computer-readable medium of claim 16, wherein the one or more instructions, that cause the device to obtain the profile, cause the device to obtain the third record that includes the snapshot of the profile, and
  wherein the one or more instructions, that cause the device to evaluate the profile, cause the device to evaluate the snapshot of the profile.

18. The non-transitory computer-readable medium of claim 16, wherein the first record being added in the first database is to trigger execution of first code to cause the second record to be added or updated in the second database,
  wherein the second record being added or updated in the second database is to trigger execution of second code to cause the third record to be added in the third database, and
  wherein the third record being added in the third database is to trigger execution of third code to cause the third record to be obtained from the third database for evaluation.

19. The non-transitory computer-readable medium of claim 15, wherein the potential transaction relates to a vehicle.

20. The non-transitory computer-readable medium of claim 15, wherein the type of content is a first type based on a first state of the profile, or a second type based on a second state of the profile.

* * * * *